US008323815B2

(12) United States Patent
Beard

(10) Patent No.: US 8,323,815 B2
(45) Date of Patent: Dec. 4, 2012

(54) OPTIMIZED MICROPOROUS STRUCTURE OF ELECTROCHEMICAL CELLS

(75) Inventor: Kirby Beard, Norristown, PA (US)

(73) Assignee: Porous Power Technology, LLC, Louisville, CO (US)

( * ) Notice: Subject to any disclaimer, the term of this patent is extended or adjusted under 35 U.S.C. 154(b) by 1329 days.

(21) Appl. No.: 11/820,140

(22) Filed: Jun. 18, 2007

(65) Prior Publication Data

US 2007/0292750 A1 Dec. 20, 2007

Related U.S. Application Data

(60) Provisional application No. 60/814,001, filed on Jun. 16, 2006.

(51) Int. Cl.
 *H01M 4/36* (2006.01)
(52) U.S. Cl. ........ 429/101; 429/126; 429/129; 429/137; 429/145; 429/153; 429/231.95; 429/246
(58) Field of Classification Search .................. 429/101, 429/126, 129, 137, 145, 153, 217, 231.95, 429/246
See application file for complete search history.

(56) References Cited

U.S. PATENT DOCUMENTS

| | | | |
|---|---|---|---|
| 3,284,274 A | 11/1966 | Hulslander et al. | |
| 3,551,364 A | 12/1970 | McGarr | |
| 3,642,668 A | 2/1972 | Bailey et al. | |
| 3,770,504 A * | 11/1973 | Bergum | 429/152 |
| 4,194,041 A | 3/1980 | Gore et al. | |
| 4,203,847 A | 5/1980 | Grandine | 210/490 |
| 4,203,848 A | 5/1980 | Grandine | 210/490 |
| 4,216,281 A | 8/1980 | O'Rell et al. | |
| 4,296,184 A * | 10/1981 | Stachurski | 429/451 |
| 4,367,271 A | 1/1983 | Hasegawa et al. | |
| 4,384,047 A | 5/1983 | Benzinger et al. | 521/64 |
| 4,399,035 A | 8/1983 | Nohmi et al. | 210/500.23 |
| 4,464,238 A | 8/1984 | Caldwell et al. | 205/518 |
| 4,629,563 A | 12/1986 | Wrasidlo | 210/500.34 |

(Continued)

FOREIGN PATENT DOCUMENTS

EP 223709 5/1987

(Continued)

OTHER PUBLICATIONS

Z.W. Li et al., "Generation of Mice With a 200-kb Amyloid Precursor Protein Gene Deletion by Cre Recombinase-Mediated Site-Specific Recombination in Embryonic Stem Cells", Proc. Natl. Acad. Sci. USA, Jun. 11, 1996, 93(12):6158-62. Erratum in Proc. Natl. Acad. Sci. USA, Oct. 15, 1996, 93(21):12052.

*Primary Examiner* — Patrick Joseph Ryan
*Assistant Examiner* — Ben Lewis

(57) ABSTRACT

An optimized electrochemical cell comprised of a housing divided into two chambers, a first chamber containing a protogenous, ion-conducting liquid and a positive high density electrode including a first active material and a porous binder, surrounded by a surface in which the porosity level increases towards the surface, a second chamber containing an aprotic, ion conducting liquid and a negative high density electrode including a second active material and a porous binder, surrounded by a surface in which the porosity level increases towards the surface. A symmetric, strong, highly porous, microporous polymer membrane divides the housing into the first and second chamber. The porosity level of the polymer membrane is 25% greater than the porosity level at the surface of the positive and negative high density electrodes.

7 Claims, 3 Drawing Sheets

U.S. PATENT DOCUMENTS

| | | | |
|---|---|---|---|
| 4,666,607 A | 5/1987 | Josefiak | 210/640 |
| 4,681,819 A | 7/1987 | Gnyra | |
| 4,810,384 A | 3/1989 | Fabre | 210/500.23 |
| 4,867,881 A | 9/1989 | Kinzer | |
| 4,933,081 A | 6/1990 | Sasaki et al. | 210/490 |
| 4,965,291 A | 10/1990 | Kitoh et al. | 521/64 |
| 5,011,698 A | 4/1991 | Antoon, Jr. et al. | |
| 5,013,339 A | 5/1991 | Mahoney | 210/500.23 |
| 5,027,572 A | 7/1991 | Purcell et al. | |
| 5,086,104 A | 2/1992 | Wada et al. | |
| 5,149,655 A | 9/1992 | McCabe et al. | |
| 5,266,391 A | 11/1993 | Donato et al. | |
| 5,318,866 A | 6/1994 | Degen et al. | |
| 5,378,558 A | 1/1995 | Hope | |
| 5,387,378 A | 2/1995 | Pintauro | 264/48 |
| 5,489,406 A | 2/1996 | Beck | 264/41 |
| 5,521,023 A | 5/1996 | Kejha et al. | |
| 5,705,084 A | 1/1998 | Kejha | |
| 5,772,930 A * | 6/1998 | Hashimoto et al. | 264/15 |
| 5,773,159 A * | 6/1998 | Beard | 429/7 |
| 5,834,107 A | 11/1998 | Wang | 428/310.5 |
| 5,922,493 A | 7/1999 | Humphrey, Jr. | 429/316 |
| 5,989,750 A | 11/1999 | Ohba | |
| 5,998,063 A * | 12/1999 | Kobayashi et al. | 429/218.1 |
| 6,013,688 A | 1/2000 | Pacheco | 521/64 |
| 6,080,511 A | 6/2000 | Kejha | |
| 6,110,309 A | 8/2000 | Wang | 156/77 |
| 6,122,772 A | 9/2000 | De Guzman | |
| 6,146,747 A | 11/2000 | Wang | 428/310.5 |
| 6,200,706 B1 | 3/2001 | Ashida | |
| 6,203,941 B1 | 3/2001 | Reichert et al. | |
| 6,251,540 B1 | 6/2001 | Kejha | |
| 6,277,439 B1 | 8/2001 | Painter | |
| 6,326,105 B1 | 12/2001 | Kejha et al. | |
| 6,337,101 B1 | 1/2002 | Gozdz | |
| 6,387,565 B1 | 5/2002 | Aihara et al. | |
| 6,396,682 B1 | 5/2002 | Kim et al. | |
| 6,432,586 B1 | 8/2002 | Zhang | 429/251 |
| 6,444,356 B1 | 9/2002 | Ma | 429/145 |
| 6,468,697 B1 | 10/2002 | Ferment et al. | |
| 6,475,670 B1 * | 11/2002 | Ito | 429/217 |
| 6,537,334 B1 | 3/2003 | DuPasquier et al. | |
| 6,537,703 B2 | 3/2003 | DuPasquier | 429/254 |
| 6,579,342 B2 | 6/2003 | Wang et al. | |
| 6,579,643 B1 | 6/2003 | Gozdz | |
| 6,586,138 B2 | 7/2003 | Pekala | 429/249 |
| 6,632,561 B1 | 10/2003 | Bauer et al. | |
| 6,815,380 B2 | 11/2004 | Snyder | |
| 6,881,337 B2 | 4/2005 | Meluch et al. | |
| 6,884,375 B2 | 4/2005 | Wang et al. | |
| 6,949,285 B1 | 9/2005 | Tobinaga et al. | |
| 6,949,317 B2 | 9/2005 | Yoshida et al. | |
| 6,994,811 B2 | 2/2006 | Kools | 264/41 |
| 6,998,193 B2 | 2/2006 | Sun | 428/274 |
| 7,008,722 B2 | 3/2006 | Huang | |
| 7,112,389 B1 | 9/2006 | Arora et al. | |
| 7,166,544 B2 | 1/2007 | Padhi et al. | |
| 7,258,914 B2 | 8/2007 | Morikawa et al. | |
| 7,338,692 B2 | 3/2008 | Smith et al. | |
| 7,351,338 B2 | 4/2008 | Tada et al. | |
| 7,455,772 B2 | 11/2008 | Tada et al. | |
| 7,981,467 B2 | 7/2011 | Doyen et al. | |
| 2004/0043224 A1 | 3/2004 | Sturnberg | 428/421 |
| 2004/0241550 A1 * | 12/2004 | Wensley et al. | 429/247 |
| 2005/0014063 A1 * | 1/2005 | Shi et al. | 429/144 |
| 2005/0266054 A1 | 12/2005 | Tsai | |
| 2006/0081530 A1 | 4/2006 | Beard | |
| 2006/0151318 A1 * | 7/2006 | Park et al. | 204/284 |
| 2007/0039268 A1 | 2/2007 | Ambrose, Jr. et al. | |
| 2007/0061900 A1 | 3/2007 | Murphy et al. | |
| 2007/0100012 A1 | 5/2007 | Beard | 521/99 |
| 2007/0198070 A1 | 8/2007 | Oliveira | |
| 2007/0243649 A1 | 10/2007 | Beard | |
| 2008/0070107 A1 | 3/2008 | Kasamatsu et al. | |
| 2009/0222995 A1 | 9/2009 | Perry et al. | |
| 2009/0223155 A1 | 9/2009 | Perry et al. | |
| 2009/0227163 A1 | 9/2009 | Perry et al. | |

FOREIGN PATENT DOCUMENTS

| | | |
|---|---|---|
| EP | 959513 | 11/1999 |
| EP | 1401037 | 3/2004 |
| JP | 518268 | 3/1993 |
| JP | 09-180709 A2 | 7/1997 |
| JP | 2001-266943 | 9/2001 |
| KR | 10-2009-0003823 | 1/2009 |
| WO | 9011092 | 10/1990 |
| WO | WO 99/63609 A1 | 12/1999 |
| WO | WO 00/51424 | 9/2000 |
| WO | WO 2004/102694 A2 | 11/2004 |
| WO | WO 2005123599 | 12/2005 |
| WO | WO 2007/147167 A1 | 12/2007 |
| WO | WO2007/147167 A3 | 1/2008 |
| WO | WO 2008/127334 A1 | 10/2008 |

* cited by examiner

OPTIMIZED MICROPOROUS STRUCTURE OF ELECTROCHEMICAL CELLS

CROSS REFERENCES AND RELATED SUBJECT MATTER

This application is a continuation of provisional patent application Ser. No. 60/814,001, filed in the United States Patent Office on Jun. 16, 2006.

BACKGROUND OF THE INVENTION

Field of Invention

The invention relates to breakthrough technology based on an entirely new concept in electrochemical (EC) cell construction, more particularly to EC cell construction utilizing novel binder matrices as an alternate means to providing performance benefits.

A key requirement in EC cells is the ability of the binder material/formulation and associated processing technique to retain adequate porosity in the components, while providing for maximum densification of the electrodes to improve cell capacity. While standard polymer binders and processing methods most commonly used to fabricate electrodes are not likely to be directly transferable into the new proposed cell designs, the use of most any of a variety of known specialized techniques are adaptable for producing cell components for the proposed improved cell designs. A new patented high porosity polymer composition and process method that has proven successful in forming battery separator films with >80% void content with sub-micron pore sizes and excellent mechanical strength is particularly useful to produce cell components with controlled pore sizes/void contents. When combined with a centrifugal casting manufacturing process, not heretofore employed in battery electrode production, a high capacity electrode with high ionic conductivity necessary for fast charge and discharge is the result.

Conventional lithium cells do not optimize the trade-off between porosity and energy in a safe, reliable cell design. The typical lithium cell uses electrode binder systems that are mostly optimized for production ease. Most lithium battery separator technology is derived from off-the-shelf microporous polymer films originally developed for other applications and therefore not optimal for addressing the unique requirements of maximizing ion conductivity in lithium ion batteries. Ions do not easily become bottlenecked within the electrodes where they are generated. Instead ions will readily flow until they meet a restriction to the flow path such as at occluded surface pores on either electrodes or separator or at interfaces between cell components where porosity drops by a large amount in going across the interface. Most conventional cells are built with a separator that is <45% porous and rarely more than 55-60% porous. These separators are then rarely combined with electrodes that are much lower in porosity usually running around 40-50% voids. The result is an electrochemical cell that has about the same void levels in the separator and the electrodes at best, but with electrode porosity usually being higher than the separator's.

The more efficient electrochemical cell is one wherein the separator's porosity is higher than that of the electrode to eliminate bottlenecks to ion flow. An electrode can vary in density to yield from 60% voids or varying percentages of 40%, 30% or 20% voids when highly consolidated by pressing or rolling. Therefore to obtain an efficient electrochemical cell, electrode porosity level must be <50% or preferably <40% or even <30% but with separator voids at least 25% or preferably 50% to 100% greater than the electrode porosity levels. The most efficient electrochemical cell contains an electrode at 20% electrode porosity level with separator void levels at >40% therefore containing a 100% higher porosity level in the separator than the electrode. Alternate efficient electrochemical cell configurations can include electrode voids at 40% and separator at 80% (100% greater) or 60% (50% higher) or even only 50% (25% higher than the electrode). In the case where 80% high porosity separator is used, the electrodes could still be as high as 64% voids and meet these specifications of being at least 25% higher.

Typical electrode constructions use an impervious polymer binder to adhere particles of active materials and conductive additives to each other and to a current collector in a low-density coating. Since active material content is typically less than 50% by volume, manufacturers often attempt to reduce the voids in the electrodes by calendaring, but these efforts often cause the polymer to compact between the solid particles, resulting in unacceptable restrictions to the flow of ions through the components with little real improvement in electrode density. Active materials include traditional powders such as $LiCoO_2$ and MCMB carbon, as well as newer ones such as $LiFePO_4$ and lithium titanate compounds. Purer, less reactive electrolyte solutions, typically using inorganic lithium salts in organic solvents, have evolved over the years to replace less stable, more costly solutions. Separators, typically constructed from polyolefins, are produced in sheet films with various, but sub-optimal, porosity and thickness. The electrodes are interleaved with separators and mechanically compressed to ensure complete, intimate contact of components. The cells are then packaged and sealed in a flexible pouch or metal can before injecting with electrolyte solutions.

Past battery design efforts often concentrated on enhancements of active materials and various individual components, using a lamination/extraction technology intended to optimize the overall construction of the lithium cell. Despite the lack of commercial success of the gel polymer system compared to liquid electrolytes and conventional electrode and separator components, improvements in the lithium cell's microstructure still represents a viable approach to realizing the full electrochemical performance of these cells. Specifically, improved performance requires a cell design based on matrix materials having a small, uniform pore structure, optimized for each cell component and lacking discontinuities at the component interfaces.

The present invention is applicable to many electrochemical systems and is intended to overcome various problems of current systems.

U.S. Patent Application 20070100012 to Beard discloses a method of producing a symmetric, strong, highly porous, microporous polymer film by (a) forming a layer of a polymer solution on a substrate, the solution comprising two miscible liquids and a polymer material dissolved therein, and wherein the first liquid has a surface tension lower than the surface energy of the polymer and the second liquid has a surface tension greater than the surface energy of the polymer; (b) producing a film of gelled polymer from the layer of polymer solution; and (c) rapidly removing the liquid from the film of gelled polymer by unidirectional mass transfer without dissolving the gelled polymer U.S. Patent Application 20040043224 to Sternberg discloses dimethylsulfoxide (DMSO) or dimethylacetamide (DMAc) as the solvent for polyvinylidene fluoride when casting a membrane onto a support structure, immediately followed by immersion in a non-solvent bath, typically methanol.

U.S. Pat. No. 4,203,847 to Grandine discloses flat sheet membranes formed by casting a nearly saturated PVDF solution in hot acetone solvent onto a heated moving belt which then passes (within 10 seconds) into a forming bath containing a mixture of 80% acetone solvent and 20% water nonsolvent, followed by water washing. This produces a thin-skinned membrane.

U.S. Pat. No. 4,203,848 to Grandine describes the belt and machine used in the '847 process.

U.S. Pat. No. 4,384,047 to Benzinger, et al. discloses the preparation of asymmetrical vinylidene fluoride polymer ultrafiltration membranes by casting a sheet of the polymer dissolved in a mixture of a triethylphosphate solvent and a glycerol non-solvent, on a smooth substrate, evaporating a portion of the solvent from the sheet, immersing said sheet in a gelation liquid (ice water), and optionally, stabilizing the gelled sheet by heat treatment thereof.

U.S. Pat. No. 4,399,035 to Nohmi, et al. discloses a polyvinylidene fluoride membrane prepared by casting a dope comprising polyvinylidene fluoride, an active solvent such as DMAc, N-methylpyrrolidone or tetramethylurea and a minor amount of a surfactant or mixture of surfactants into a non-solvent bath, typically water or an alcohol. Polyethylene glycol and polypropylene glycol are used as surfactants and glycerin fatty acid esters are mentioned in the description as being suitable.

U.S. Pat. No. 4,464,238 to Caldwell, et al. defines "MacMullin Number," $N_{MAC}$, as the ratio of the electrical resistance of an electrolyte-saturated porous medium, R, to the resistance of an equivalent thickness and area of electrolyte, $R_0$. MacMullin Number is a relative measure of resistance to movement of ions through a porous membrane.

U.S. Pat. No. 4,629,563 to Wrasidlo discloses ultraporous and microporous asymmetric membranes of numerous polymers. The membranes have an entirely reticulated structure free of large finger voids. The reticulated support structure has a gradually increasing pore size that reaches a maximum of from about 10 to about 20,000 times the diameter of the skin pores at the opposite face. Solvents which may be used include: dimethylformamide, dimethylacetamide, dioxane, N-Methyl pyrrolidone, dimethylsulfoxide, chloroform, tetramethyl-urea, and tetrachloroethane. The non-solvents include: methanol, heptane, ethanol, octane, isopropanol, acetone, amyl alcohol, methylethylketone, hexanol, methylisobutyl ketone, heptanol, nitropropane, octanol, butyl ether, propane, ethyl acetate, hexane, and amyl acetate. A mixture of 8 parts by weight polyvinylidene fluoride, 9.3 parts by weight glycerin, and 82.7 parts by weight dimethylformamide was stirred at ambient temperature for two hours. After degassing, the mixture had a turbidity of 0.8 optical density at 420 nanometers and was cast into water to form a membrane.

U.S. Pat. No. 4,666,607 to Josefiak describes a thermal gelation process. It discloses the use of a quench tube in the form of a U-tube, or a tank with the fiber moving as if in a U-tube, which can be used to produce polyvinylidene fluoride films or hollow fibers by extrusion of a solution comprising the polymer, solvent(s) and a non-solvent above the temperature at which the solution will separate into two phases, advantageously through an air gap into a cooling liquid in the quench tube or tank. In the case of hollow fibers, a lumen forming fluid (which is not a solvent for the polymer) is employed.

U.S. Pat. No. 4,810,384 to Fabre describes a process wherein polyvinylidene difluoride and a hydrophilic polymer compatible therewith are dissolved in a mixture of lithium chloride, water and dimethylformamide, then cast onto a web and coagulated by passing the film through a water bath. A hydrophilic membrane that is a blend of the two polymers is produced.

U.S. Pat. No. 4,933,081 to Sasaki, et al. describes preparation of an asymmetric micro-porous membrane having a layer of minimum pores inside. The membrane is produced by a kind of dry-wet method in which a gas is brought into contact with the surface of the spread solution before it is immersed in a solidifying bath to form a coacervation phase only in the surface layer of the spread solution. A homogeneous raw solution for forming a membrane was prepared by dissolving 20 parts of polyvinylidene fluoride, 60 parts of dimethyl-acetamide as a good solvent, and a non-solvent consisting of 10 parts of polyethylene glycol 200, 10 parts of poly(vinylpyrrolidone) and 0.7 parts of water. The solution was spread evenly over a glass plate using a doctor blade to have a spread solution thickness of 150 microns. Warm air at 60° C. (relative humidity 30%) was blown to the surface of the spread solution samples at a rate of 0.8 m/sec for up to 30 seconds. Then the samples were immediately immersed in warm water at 60° C. for 2 minutes and further in cool water at 20° C. The minimum pore layer was formed inside the membrane when warm air was blown for 2 to less than 30 seconds. The patent also uses water as a solvent for a film combining polysulfone and PVP (the PVP dissolves readily in water). The asymmetric membranes had pore ratios (center size to skin size) ranging from 10 to 100.

U.S. Pat. No. 4,965,291 to Kitoh, et al. discloses a method of manufacturing a porous membrane by dissolving vinylidene fluoride polymer in a good solvent such as acetone and then causing solidification of the resultant solution in a non-solvent. The dissolution of the vinylidene fluoride polymer in the solvent is done in a predetermined pressure condition, preferably in a range of 0.5 to 5.0 kg/cm². A mixture of vinylidene fluoride and vinylidene fluoride/propylene hexafluoride copolymer in a weight ratio of 80:20 was added to acetone as a good solvent such that the polymer concentration was 19.0% by weight. The resultant solution was heated to 62° C. while pressurizing it to 1.0 kg/cm² with agitation to obtain a uniform polymer solution. This solution was cast on a film which was then immersed in 1,1,2-trichloro-1,2,2-trifluoroethane and then dried to room temperature.

U.S. Pat. No. 5,013,339 to Mahoney describes preparing a polyvinylidene fluoride polymer membrane containing (1) a polyvinylidene fluoride polymer, (2) glycerol mono-acetate, glycerol diacetate, glycerol triacetate, or mixtures thereof, and (3) optionally glycerol, wherein the polyvinylidene fluoride polymer membrane so prepared is useful for a membrane liquid separation process such as microfiltration, ultra-filtration, dialysis, or membrane stripping. Preferably the polyvinylidene fluoride polymer membrane is made by forming a mixture of the composition, heating the mixture to a temperature at which the mixture becomes a homogeneous fluid, and extruding, molding, or casting the homogeneous fluid into water to form a porous membrane.

U.S. Pat. No. 5,387,378 to Pintauro describes fabricating an asymmetric fluoropolymer membrane having a first surface comprised of a dense layer of the fluoropolymer material, and an opposite second surface comprised of a porous layer of the fluoropolymer material, by (a) dissolving a fluoropolymer material in a solvent mixture of a low boiling point (40-60° C.) solvent and a high boiling point (140-200° C.) solvent to form a solution; (b) depositing the solution on a casting surface; and (c) removing the solvent from the solution, to precipitate the membrane. The solvent removing step requires two steps: (i) evaporating the solvent by air drying the solution for a sufficient period of time until the surface of the solution at the air interface has gelled, and then (ii) immersing the solution in a precipitation bath prepared from a major amount of a non-solvent and a minor amount of a solvent.

U.S. Pat. No. 5,489,406 to Beck discloses a method of making a porous polymeric material by heating a mixture containing polyvinylidene fluoride and a solvent system of (i) a latent solvent (a glycerol ester such as glycerol triacetate, glycerol tripropionate, glycerol tributyrate and partially-esterified glycerol) and (ii) a non-solvent (e.g. a higher alcohol, glycol or polyol), at elevated temperatures. The patent specifically excludes active solvents such as acetone. The solution is extruded as a fiber and then rapidly cooled so that non-equilibrium liquid-liquid phase separation takes place to form a continu-ous polymer rich phase and a continuous polymer lean phase with the two phases being intermingled in the form of bicontinuous matrix of large interfacial area. Cooling is continued until the polymer rich phase solidifies. The polymer lean phase is then removed from the solid polymeric material by a lumenal gas wash procedure at a pressure of about 600 kPa (87 psi).

U.S. Pat. Nos. 5,834,107, 6,110,309, and 6,146,747 all to Wang describe preparing a polyvinylidene difluoride membrane by adding a water-soluble polymer along with the PVDF, and then using humid air followed by hot water as the quench and extractant. More particularly, they provide a casting dope of about 12-20% by weight of PVDF and between up to 30% by weight of a hydrophilic polymer such as polyvinylpyrrolidone, dissolved in a solvent; casting the dope to form a thin film; exposing the thin film to a humid gaseous environment; coagulating the film in a water bath; and then recovering a formed assymetric microporous PVDF membrane.

U.S. Pat. No. 5,922,493 to Humphrey describes an electrochemical cell having a positive electrode, an absorber-separator and a negative electrode wherein at least one of the electrodes or absorber-separator comprises a porous polyvinylidene fluoride. The porous polyvinylidene fluoride electrodes have an electrode material combined therewith, and the porous polyvinylidene fluoride absorber-separator has an electrolyte material combined therewith.

U.S. Pat. No. 6,013,688 to Pacheco describes methods for making microporous polyvinylidene fluoride (PVDF) membranes from vinylidene fluoride polymers and the products produced. The process includes dissolving the polymer at a temperature of 20 to 50° C. in a liquid that includes a solvent and a co-solvent for the polymer. The solvent: co-solvent mixture requires at least one solvent selected from N-methyl-2-pyrrolidone, tetrahydrofuran, methyl ethyl ketone, dimethylacetamide, tetramethyl urea, dimethyl sulfoxide and trimethyl phosphate. The co-solvent is preferably selected from formamide, methyl isobutyl ketone, cyclohexone, diacetone alcohol, isobutyl ketone, ethyl acetoacetate, triethyl phosphate, propylene carbonate, glycol ethers, glycol ether esters, and n-butylacetate. The solution is then heated or maintained at a desired temperature for a particular pore size. Then the solution is spread onto a solid surface to form a film and the solvent:co-solvent mixture is displaced from the film with a bath of a co-solvent:non-solvent liquid mixture.

U.S. Pat. No. 6,432,586 to Zhang describes a separator for a high-energy rechargeable lithium battery and the corresponding battery in which the separator includes a ceramic composite layer and a polymeric microporous layer. The ceramic layer is a mixture of inorganic particles in a matrix material. The ceramic layer is adapted, at least, to block dendrite growth and to prevent electronic shorting. The polymeric layer is adapted, at least, to block ionic flow between the anode and the cathode in the event of thermal runaway.

U.S. Pat. No. 6,444,356 to Ma describes a secondary lithium battery separator of a fibrous core coated with a polymer having improved electrode adhesion properties in a unitary laminated construction. The separator is made of a preformed porous non-woven mat of a first homopolymer of polypropylene, polyethylene, or polyvinylalcohol, coated with a second homopolymer. Porosity of the homopolymeric coating, which may preferably be polyvinylidene difluoride, is obtained by first mixing the homopolymer with a low boiling solvent, e.g. acetone, and a non-aromatic aliphatic diester plasticizer, followed by forming a layer of the polymer-diester-acetone mixture on a fiber sheet, incorporating the sheet into a battery and then subjecting the entire structure to a vacuum to remove residual plasticizers.

U.S. Pat. No. 6,537,703 to DuPasquier describes adding an alcohol to the polymer solution as a non-solvent. The alcohol, which has a low surface tension, is selected to evaporate at a temperature higher than the primary solvent (acetone), and the transition from liquid to solid involves selective evaporation of the acetone prior to that of the alcohol. This causes gelation of the polymer to occur. The process results in significant shrinkage of the film in its thickness direction (from 250 micron wet film to 50 micron dry film). Moreover it requires the use of fumed silica (7 parts silica per 10 PFDF polymer) to reinforce the film strength to make thin films.

U.S. Pat. No. 6,586,138 to Pekala describes a freestanding battery separator that includes a microporous polymer web with passageways that provide overall fluid permeability which contains (i) ultra high molecular weight polyethylene (UHMWPE) and (ii) a gel-forming polymer material. In one embodiment, the gel-forming polymer material is a coating on the UHMWPE web surface. In a second embodiment, the gel-forming polymer material is incorporated into the UHMWPE web while retaining overall fluid permeability. Both embodiments produce hybrid gel electrolyte systems in which gel and liquid electrolyte co-exist.

U.S. Pat. No. 6,994,811 to Kools describes a process for making macrovoid-free microporous membranes from a polymer solution and the membranes there from by means of a thermal assist, such as heating of the polymer solution subsequent to forming a film, tube or hollow fiber of the solution under conditions that do not cause phase separation. The formed solution is briefly heated to generate a temperature gradient through the body of the formed solution. The polymer in solution then is precipitated by immersion into a liquid bath of such as methanol to form a microporous structure by. The formation of a wide variety of symmetric and asymmetric structures can be obtained using this process. Higher temperatures and/or longer heating times effected during the heating step result in larger pore sizes and different pore gradients in the final membrane product.

U.S. Pat. No. 6,998,193 to Sun describes a battery having at least one positive electrode, at least one negative electrode, an electrolyte, and a homogeneous microporous membrane that contains (a) a hot-melt adhesive, (b) an engineering plastics, (c) optionally a tackifier, and (d) a filler having an average particle size of less than about 50 microns. The microporous membrane is bound permanently onto the surface of a positive electrode or a negative electrode. The hot-melt adhesive, engineering plastic and filler are distributed in the microporous membrane.

U.S. Patent Application 2004/0241550-A1 to Wensley describes a battery separator for a lithium battery in the form of a microporous membrane (generally UHMWPE) and coated on both sides. The coatings are made from a mixture of a gel forming polymer, a first solvent such as tetrahydrofuran, methylethylketone, acetone, low molecular weight glymes, and combinations thereof, and a second solvent or non-solvent such as propanol, isopropanol, butanol, and mixtures thereof. The first solvent is more volatile than the second solvent. The second solvent or non-solvent acts as a pore former for the gel-forming polymer. A small amount of water may also be added along with the second solvent or non-solvent. The first solvent is allowed to evaporate, preferably without the use of heat. Thereafter, the second solvent or non-solvent is removed in an oven with the application of heat. The process also requires a controlled high humidity for gelation when coated onto a Celgard film. By controlling the relative humidity (% RH) during the coating process, the uniformity of resistance (measured by the MacMullin Number) may be controlled. It has been determined that when the % RH is below 45%, the MacMullin Number (as defined in U.S. Pat. No. 4,464,238, incorporated therein by reference) may be controlled to be within the range of 5-12, preferably 5-6 with a coating density of about 0.25 mg/cm$^2$.

Japanese Pat. No. 51-8268 uses cyclohexanone as a solvent for polyvinylidene difluoride. The solution is heated and then cooled during which time the solution passes through a region of maximum viscosity. The membrane is cast when the viscosity of the solution is decreasing.

European Patent No. 223,709 discloses a mixture of acetone and dimethyl formamide (DMF) as a preferred solvent although all the usual standard or active solvents such as ketones, ethers such as tetrahydrofuran and 1,4 dioxane, and amides such as DMF, DMAC and DMSO are described. To form the membrane, the polymer solution is coated onto a substrate and then the coating is immediately immersed into a bath of a poor solvent.

While these units may be suitable for the particular purpose employed, or for general use, they would not be as suitable for the purposes of the present invention as disclosed hereafter.

SUMMARY OF THE INVENTION

It is an object of the invention to produce a unique ion battery which increases battery capacity and performance by overcoming low porosity in the separator while achieving high density electrodes thereby increasing ion flow within the battery components.

It is an object of the invention to produce a means for eliminating restrictions to ion flow as well as detrimental interfacial discontinuities between components in electrochemical cells.

It is another object of the invention to provide a means for overcoming low porosity in the polymer membrane while increasing density in the electrodes thereby increasing battery capacity over extended cycling.

It is another object of the invention to provide a convenient means for improving communication of electrolyte solutions with cell components and to provide free unrestricted ionic transport throughout the cell during operation.

It is another object of the invention to provide a means for including an unprecedented level of porosity (>80% within the polymer phase) that can be used to produce both highly densified electrodes and highly porous separators in a durable matrix.

It is a further object of the invention to provide pores in these components that can be tailored to different size requirements, tortuousness, and void distributions.

It is another object of the invention to provide a low-cost formulation and manufacturing process adaptable to various battery constructions, including laminated electrodes, without creating major interfacial resistances.

It is a further object of the invention to eliminate design defects and achieve the capabilities inherent in the active materials and electrolytes thereby obtaining cell performance which can reach 50% of capabilities, a 50% improvement over the current state of the art.

The present invention combines the highly densified electrode with a symmetric, strong, highly porous, microporous polymer film that functions as a separator between the positive and negative electrodes within the electrochemical cell. The high strength and uniform porosity of the polymer film allow for more efficient travel of ions, resulting in maximum current flow within the electrochemical cell. The invention combines improved ion availability resulting from the highly densified electrodes with unimpeded flow of ions through the symmetric, strong, highly porous, microporous polymer film to create an electrochemical cell of improved capacity and efficiency.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

The invention is an improved technology in electrochemical cell construction. Novel processes are employed to produce components with characteristics that enhance performance over existing electrochemical cells. Specifically, a component for an electrochemical cell is formed using centrifugal forces to density an electrode or electrode material. In some embodiments, a binding agent may be used to mechanically bind active material for processing and normal operation. The binding agent may be a dispersed solid material as well as a pore forming material. Thus densified, the electrode has enhanced efficiency and power capability as more active material is available per unit volume to react with the surrounding electrolyte. Furthermore, the centrifugation process results in a high density active material that becomes increasingly porous near its surface, allowing the electrolyte to contact and react with a larger surface area of active material. In some embodiments, multiple layers of a device may be constructed using single or plural centrifugal processing steps.

The present invention is an optimized electrochemical cell comprised of a housing divided into two chambers, a first and a second chamber. The first chamber containing a protogenous, ion-conducting liquid and a positive high density electrode including a first active material and a porous binder, surrounded by a surface in which the porosity increases towards the surface. The second chamber containing an aprotic, ion conducting liquid and a negative high density electrode including a second active material and a porous binder, surrounded by a surface in which the porosity increases towards the surface. The optimized electrochemical cell also contains a symmetric, strong, highly porous, microporous polymer membrane which divides the housing into the first and second chamber. In the optimized electrochemical cell, the porosity of the polymer membrane is at least 25% greater than the porosity at the surface of the positive and negative high density electrodes.

Figure 1:
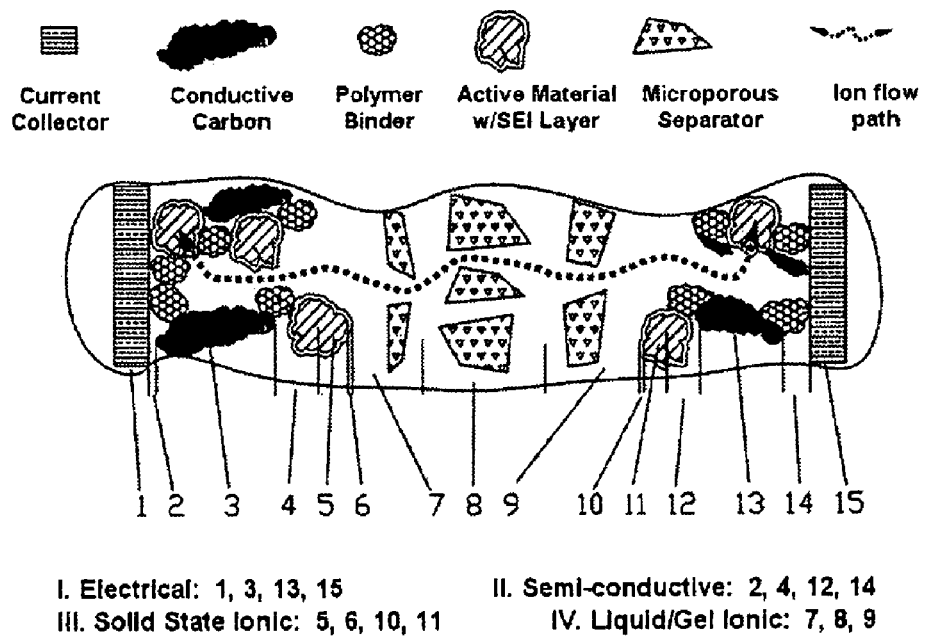
FIG. 1 is a sectional view across a typical lithium cell electrode pair for modeling hypothetical electrical and ionic resistances with electrolyte solution/gel filling pore spaces, and including a comparison of ideal cell stack construction versus conventional technology.

Lithium cell batteries are a plurality of electrochemical cells connected together. The design of these batteries can be modeled as an array of electrical and ionic resistances as shown in FIG. 1. More porous components improve conductivity levels throughout the cell and directly affect power and capacity. The performance of these cells is greatly impacted by the structure of the components, including path length and cross-sectional area for ion flow within the pores of the various cell components.

Figure 2:
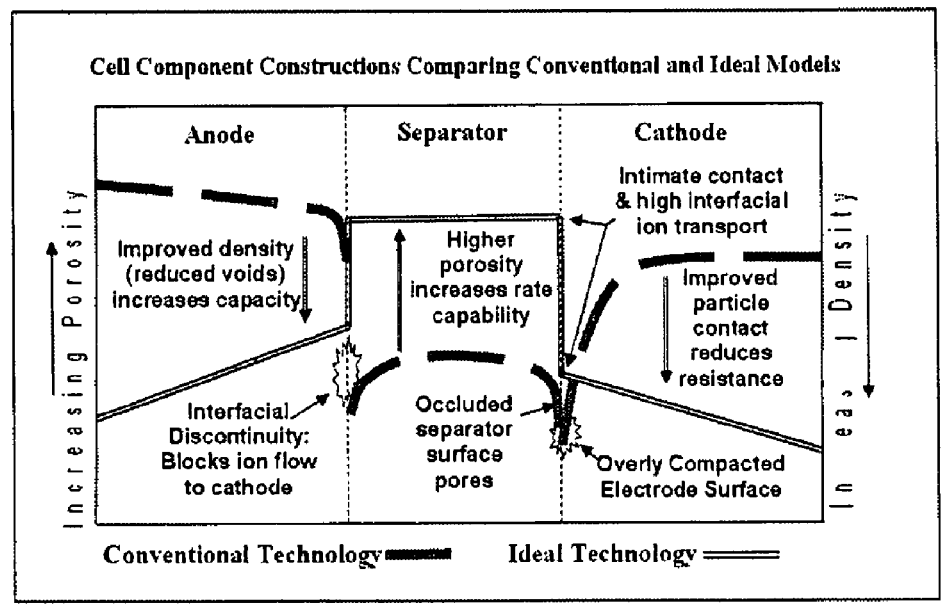
FIG. 2 is a sectional view showing two extremes of cell pore structure.

To improve overall cell conductivity and performance, modification of the pathways for ion conduction through the electrodes and separators is needed as shown in FIG. 2. The dashed line shows a typical cell using calendared, low density electrodes and a commercial separator. The double line 210 indicates the cell design goal of higher density electrodes with increasing porosity towards the surface, along with a more highly open separator layer.

1. Method for Producing a High Density Electrode

Figure 3:
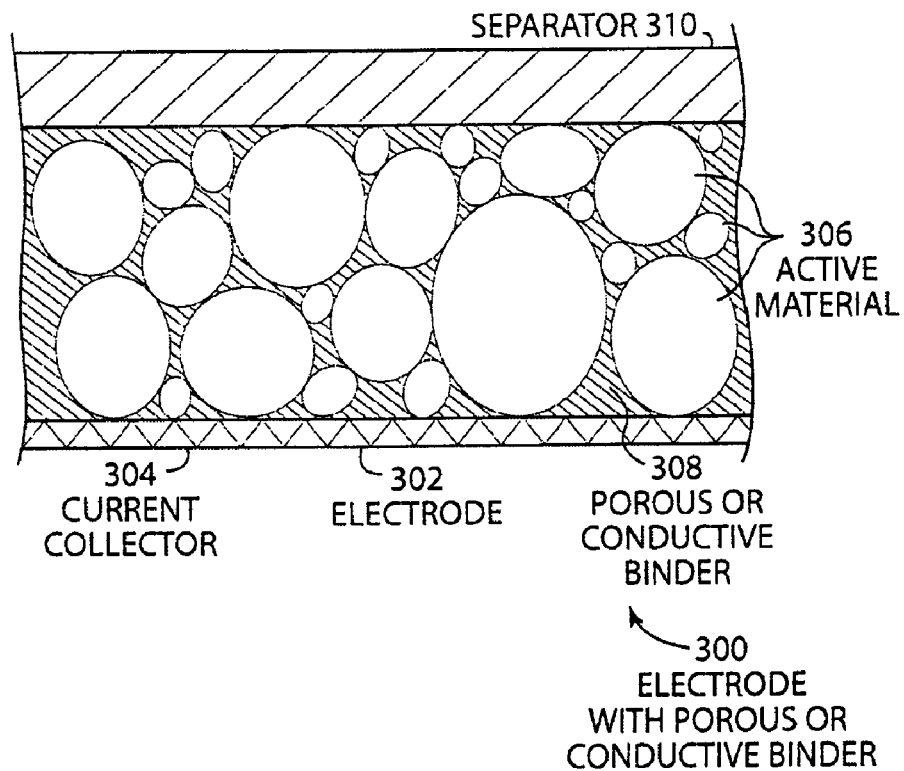
FIG. 3 is a schematic illustration of an embodiment showing a cross section of an electrode with porous or conductive binder with a separator applied to the electrode.

FIG. 3 is a schematic illustration of an electrode. The electrode 302 has a current conductor 304 with active material 306 held in a matrix of porous or conductive binder 308. A separator 310 is applied to the electrode 302. The electrode 300 illustrates an active material 306 that may be densified or compacted using a centrifuge. The matrix of a binder 308 may hold the active material 306 in place for stability during manufacturing and enhanced durability in a finished device. The binder 308 may be a porous binder with pores sized smaller than the smallest nominal size of the active material 306.

In alternate electrode embodiments, the smallest active material particle size may be ten times or more larger than the nominal pore size of the binder. In some cases, a solid conductive binder 308 may be used. Such a binder may also serve as a solid electrolyte. When a solid conductive binder is used, it may be desirable to have very few voids between the conductive binder and the active material. Similarly, a porous binder may also be applied in a manner that few voids are present, other than the pores within the porous binder. The separator 310 in the electrode 300 may be a separately applied film that is attached by heat, pressure, or another process or combination of processes. The separator 310 may be applied by spraying, extruding, casting, or other processes whereby the separator 310 may be applied with a transport media. The transport media may be evaporated, drawn off, or otherwise removed from the separator 310.

A further method for making the positive high density electrode is by adding a binder to the first active material to form an unprocessed electrode material, mixing said first active material with the binder using a transport medium. The first active material, which has a specific gravity that is at least 10 percent higher than the specific gravity of the transport medium, is processed in a centrifuge to produce a processed electrode material and is then processed into an electrochemical device.

In a typical version of the electrode 302, the composition may be between 40% and 70% by volume active material, with 2% to 30% by volume porous binder having 50-90% micropores. The remaining volume may be voids.

The separator 310 and/or the current collector 304 may be used to provide mechanical stability and durability to the assembly during manufacturing and use. The active material 306 is illustrated in many different particle sizes, including particles that may be 10 times as large as the size of a smaller particle. In other embodiments of the separator, the pore size may be the same nominal size or even larger than the smallest size of active material particles. In some embodiments of the separator, a mixture of large and small particles may result in denser electrodes during the centrifugal process step than uniform sized particles. In some embodiments of the separator, the pore size may be larger than the size of the smallest size of the active material particles. By using a centrifugal compaction process, the active materials may be mechanically interlocked so that small particles of active material may not migrate and cause shorts or other problems. Additionally, a porous binder may aid in holding the compacted and mechanically interlocked particles together.

Figure 4:
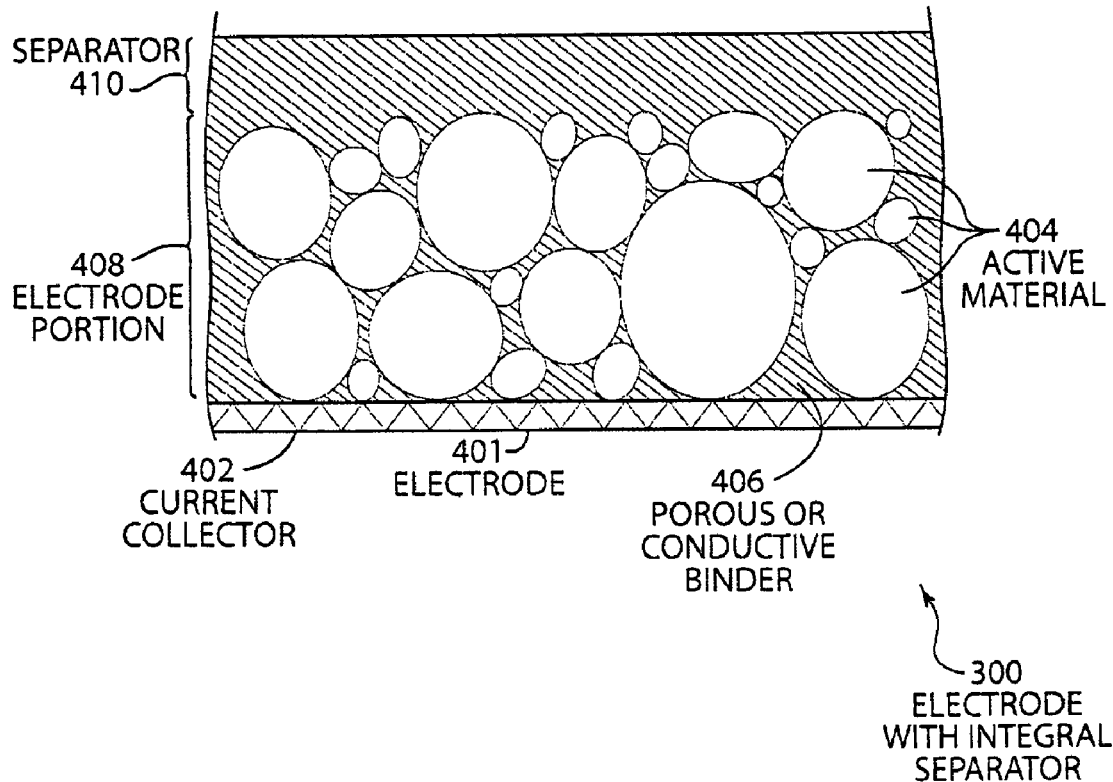
FIG. 4 is a schematic illustration of an embodiment showing a cross section of an electrode with porous or conductive binder with a separator made from the porous binder material.

In FIG. 4 the electrode 401 has a current collector 402, active material 404, and a porous or conductive binder 406. The electrode 401 has an electrode portion 408 and a separator 410. The separator portion 410 may be made from the porous binder material 406. Embodiment 400 is similar to embodiment 300 with the exception that excess porous or conductive binder 406 forms the separator 410. During a centrifugal process step, centrifugal forces may force the active material 404 to consolidate against the current collector 402 and excess porous or conductive binder 406 may rise to the surface to form the separator 410. Such a process is possible when the specific density of the active material is higher than the specific gravity of the porous or conductive binder 406. When the porous or conductive binder 406 has a higher specific gravity than the active material 404, such a structure may be formed in a centrifuge, but the separator side would be toward the outer radius of the centrifuge. The difference between the specific gravities of the active material 404 and the porous or conductive binder 406 may affect the centrifugal process step. When the difference is great, the active material 404 may separate with less time or force in the centrifuge. When the difference is small, the centrifugal processing time and/or force may be substantially higher to force the separation of the two materials. In many embodiments, the active material 404 may be mixed with the binder material 406 in a liquid, paste, gel, slurry, or other form that uses a transport media. The transport media may function as a solvent for either or both of the active material 404 or porous or conductive material 406. In some embodiments, the transport media or a portion of the transport media may serve as a pore forming material for the binder.

Figure 5:
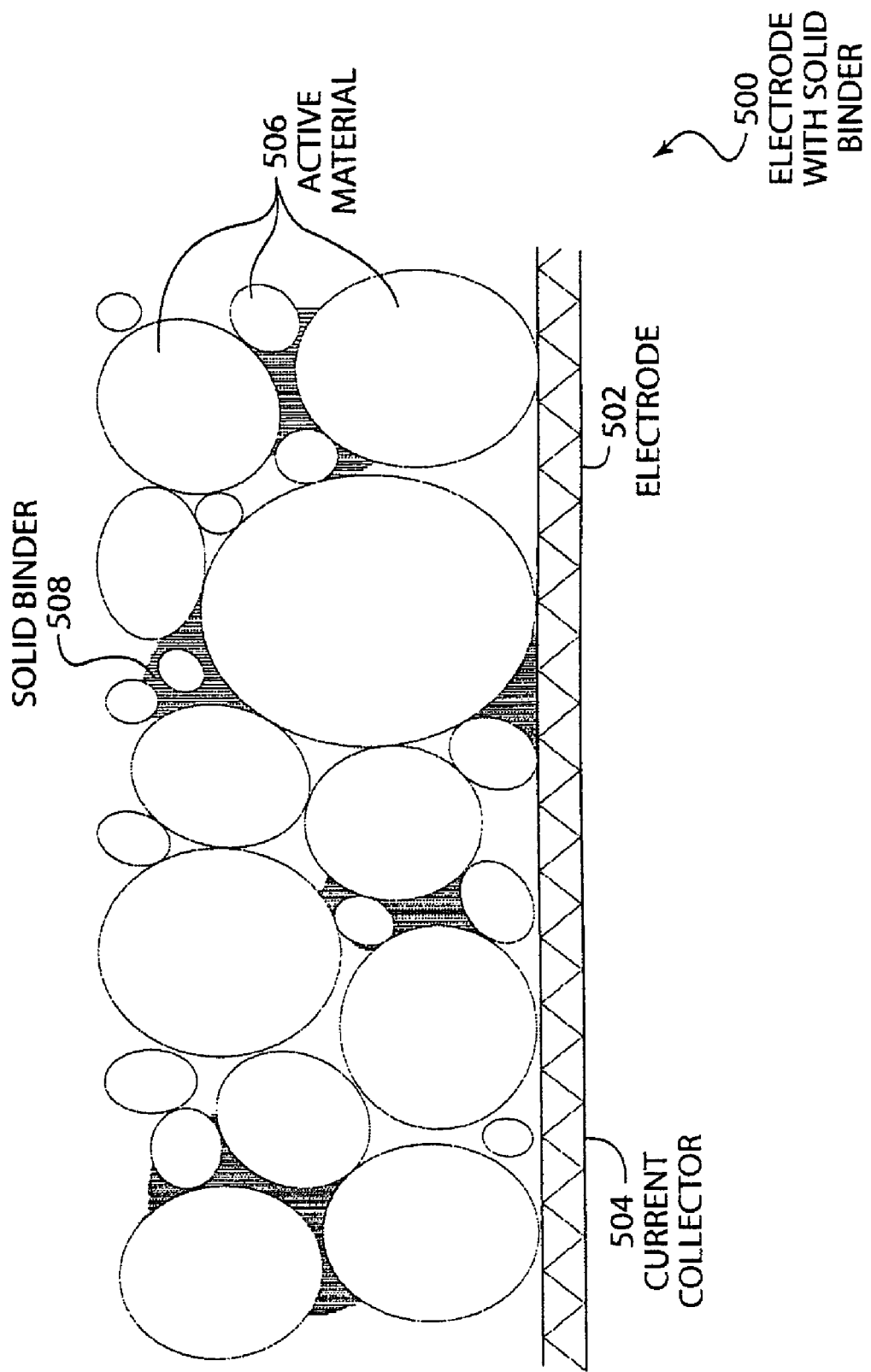
FIG. 5 is a schematic illustration of an embodiment showing a cross section of an electrode with a solid binder.

In FIG. 5 the electrode 502 has a current collector 504, active material 506, and a solid binder 508. The solid binder is dispersed around the active material 506 so that the active material 506 may be mechanically held but with some gaps to allow electrolyte to contact the active material 506. Embodiment 500 may be formed using a centrifugal process step to consolidate the active material 506. In some embodiments of the, the solid binder 508 may be processed with the active material 506 in a centrifuge, while in other embodiments the binder 508 may be applied after centrifugal processing. A solid binder 508 may be applied using a transport media that contains the binder 508 in suspension or solution. During a centrifugal processing step, the solid binder 508 may be deposited or precipitated and bound with the active material 506. In a typical version of embodiment 500, the composition may be between 40% and 70% by volume active material, with 5% to 30% by volume solid binder. The remaining volume may be voids. Various samples of separators with varied porosity (40 to >80%) along with a commercially available separator were tested for cycling capability at high rates. The increased porosity across these samples would be expected to correlate with increased high rate performance, which indeed is the general case.

2. Method for Producing a Highly Porous Polymer Membrane

A method of producing a symmetric, strong highly porous, microporous, polymer membrane is by (a) forming a layer of a polymer solution on a substrate, where the polymer solution comprises two miscible liquids and a polymer material is dissolved, and where the two miscible liquids are composed of, (i) a principal liquid that has a surface tension at least 5% lower than the surface energy of the polymer and(ii)a second liquid that has a surface tension at least 5% greater than the surface energy of the polymer, (b) producing a film of gelled polymer from the layer of polymer solution under conditions sufficient to provide a non-wetting, high surface tension solution within the layer of polymer solution, and (c) rapidly removing the liquid from the film of gelled polymer by unidirectional mass transfer without dissolving the gelled polymer to produce the strong, highly porous, microporous polymer film.

In another embodiment of the polymer membrane the method for producing a symmetric, strong, highly porous, microporous polymer membrane is by (a) preparing a solution of one or more polymers in a mixture of a principal liquid which is a solvent for the polymer and a second liquid which is miscible with the principal liquid, where (i) the principal liquid has a surface tension at least 5% lower than the surface energy of the polymer, (ii) the second liquid has a surface tension at least 5% higher than the surface energy of the polymer, (iii) the normal boiling point of the principal liquid is less than 125° C. and the normal boiling point of the second liquid is less than about 160° C., (iv) the polymer has a lower solubility in the second liquid than in the principal liquid, and (v) the solution is prepared at a temperature less than about 20° C. above the normal boiling point of the principal liquid and while precluding any substantial evaporation of the principal liquid. Next, (b) reducing the temperature of the solution by at least 5° C. to between the normal boiling point of the principal liquid and the temperature of the substrate upon the solution is to be cast. Finally, (c) casting the polymer solution onto a high surface energy substrate to form a liquid coating thereon, said substrate having a surface energy greater than the surface energy of the polymer, and (d) removing the principal liquid and the second liquid from the coating by unidirectional mass transfer without use of an extraction bath, (ii) without re-dissolving the polymer, and (iii) at a maximum air temperature of less than about 100° C. in a period of about 5 minutes, to form the strong, highly porous, thin, symmetric polymer membrane.

In a third embodiment of the polymer membrane the method for producing a symmetric, strong, highly porous, microporous polymer membrane is by (a) dissolving about 3 to 20% by weight of a polymer in a heated multiple liquid system comprising (a) a principal liquid which is a solvent for the polymer and (b) a second liquid to form a polymer solution, wherein (i) the principal liquid has a surface tension at least 5% lower than the surface energy of the polymer, (ii) the second liquid has a surface tension at least 5% greater than the surface energy of the polymer; and (iii) the polymer has a lower solubility in the second liquid than it has in the principal solvent liquid. Next,(b) reducing the temperature of the solution by at least 5° C. to between the normal boiling point of the principal liquid and the temperature of the substrate upon which it will be cast; (c) casting a film of the fully dissolved solution onto a substrate which has a higher surface energy than the surface energy of the polymer; (d) precipitating the polymer to form a continuous gel phase while maintaining at least 70% of the total liquid content of the initial polymer solution. The precipitation caused by a means selected from the group consisting of cooling, extended dwell time, solvent evaporation, vibration, or ultrasonics, and (e) removing the residual liquids without causing dissolution of the continuous gel phase by unidirectional mass transfer without any extraction bath, at a maximum film temperature which is less than the normal boiling point of the lowest boiling liquid, and within a period of about 5 minutes, to form a strong, highly porous, thin, symmetric polymer membrane.

Each of the processes for producing the highly porous polymer membrane begins with the formation of a solution of one or more soluble polymers in a liquid medium that comprises two or more dissimilar but miscible liquids. To form highly porous products, the total polymer concentration will generally be in the range of about 3 to 20% by weight. Lower polymer concentrations of about 3 to 10% are preferred for the preparation of membranes having porosities greater than 70%, preferably greater than 75%, and most preferably greater than 80% by weight. Higher polymer concentrations of about 10 to 20% are more useful to prepare slightly lower porosity membranes, i.e. about 60 to 70%.

A suitable temperature for forming the polymer solution generally ranges from about 40° C. up to about 20° above the normal boiling point of the principal liquid, preferably about 40 to 80° C., more preferably about 50° C. to about 70° C. A suitable pressure for forming the polymer solution generally ranges from about 0 to about 50 psig. Preferably a sealed pressurized system is used.

This polymer membrane requires the presence of at least two dissimilar but miscible liquids to form the polymer solution from which a polymer film is cast. The first "principal" liquid is a better solvent for the polymer than the second liquid and has a surface tension at least 5%, preferably at least 10%, lower than the surface energy of the polymer involved. The second liquid may be a solvent or a non-solvent for the polymer and has a surface tension at least 5%, preferably at least 10%, greater than the surface energy of the polymer. The invention does not require and avoids the use of a special gelation medium.

The principal liquid is at least 70%, preferably about 80 to 95%, by weight of the total liquid medium. The principal liquid can dissolve the polymer at the temperature and pressure at which the solution is formed. The dissolution will generally take place near or above the boiling temperature of the principal liquid, usually in a sealed container to prevent evaporation of the principal liquid. The principal liquid has a greater solvent strength for the polymer than the second liquid. Also the principal liquid has a surface tension at least about 5%, preferably at least about 10%, lower than the surface energy of the polymer. The lower surface tension often leads to better polymer wetting and hence greater solubilizing power.

The second liquid, which generally represents about 1 to 10% by weight of the total liquid medium, must be miscible with the first liquid. It does not normally dissolve the polymer as well as the first liquid at the selected temperature and pressure and it has a higher surface tension than the surface energy of the polymer. Preferably the second liquid does not wet the polymer at the gelation temperature though it may wet the polymer at more elevated temperatures.

This process for producing a highly porous membrane uses a unique liquid medium for forming the polymer solution. The liquid medium is rapidly removable at a sufficiently low temperature that the liquid removal does not cause the formed polymer gel to re-dissolve during the liquid removal process. The liquid medium is devoid of plasticizers. The liquids that form the liquid medium are relatively low boiling point materials. Generally the liquids normally boil at temperatures less than about 125° C., preferably about 100° C. and below. Somewhat higher boiling point second liquids, i.e. up to about 160° C., may be used if at least about 60% of the total liquid medium is removable at a low temperature, e.g. less than about 50° C. The balance of the liquid medium can be removed at a higher temperature and/or under reduced pressure. Suitable removal conditions depend upon the specific liquids, polymers, and concentrations utilized.

Preferably the liquid removal is completed within a short period of time, e.g. less than 5 minutes, preferably within about 2 minutes, and most preferably within about 1.5 minutes. Rapid low temperature liquid removal, preferably using air flowing at a temperature of about 80° C. and below, most preferably at about 60° C. and below, without immersion of the membrane into an other liquid has been found to produce a membrane with enhanced uniformity. The liquid removal is preferably done in a tunnel oven with an opportunity to remove and/or recover flammable, toxic or expensive liquids. The tunnel oven temperature is generally operated at a temperature less than about 90° C., preferably less than about 60° C.

The polymer solution as formed may be supersaturated, but more commonly it will not be. When the solution is not initially supersaturated, it can become supersaturated upon cooling prior to film formation. Alternatively, it can become supersaturated after film formation by means of evaporation of a portion of the principal liquid. In each of the these cases, a polymer gel is formed while there is still sufficient liquid present to generate the desired high void content in the resulting polymer film when that remaining liquid is subsequently removed.

After the polymer solution has been prepared, it is then formed into a thin film. The film-forming temperature is preferably lower than the solution-forming temperature. The film-forming temperature should be sufficiently low that a polymer gel will rapidly form. That gel must then be stable throughout the liquid removal procedure. A lower film-forming temperature can be accomplished, for example, by pre-cooling the substrate onto which the solution is deposited, or by self-cooling of the polymer solution by controlled evaporation of a small amount of the principal liquid.

The film-forming step usually occurs at a lower temperature (and often at a lower pressure) than the solution-forming step. Commonly, it occurs at or about room temperature. However, it can occur at any temperature and pressure if precipitation of the polymer is caused by means other than cooling, e.g. by slight drying, extended dwell time, vibrations, or the like. Application as a thin film allows the polymer to precipitate in a geometry defined by the interaction of the liquids of the solution.

The thin film may be formed by any suitable means. Extrusion or flow through a controlled orifice or by flow through a doctor blade is most common. The substrate onto which the solution is deposited should have a surface energy higher than the surface energy of the polymer. Examples of suitable substrate materials (with their surface energies) include copper (44 dynes/cm), aluminum (45 dynes/cm), glass (47 dynes/cm), polyethylene terephthalate (44.7 dynes/cm), and nylon (46 dynes/cm). Preferably a metal, metallized or glass surface is used. More preferably the metallized surface is an aluminized polyalkylene such as aluminized polyethylene and aluminized polypropylene.

In view of the thinness of the films, the temperature throughout is thought to be relatively uniform, though the outer surface may be slightly cooler than the bottom layer. Thermal uniformity may enable the subsequent polymer precipitation to occur in a more uniform manner.

The polymer membranes should be cooled/dried in a manner that prevents coiling of the polymer chains. Thus the cooling/drying should be conducted rapidly, i.e. within about 5 minutes, preferably within about 3 minutes, most preferably within about 2 minutes, because a rapid solidification of the spread polymer solution facilitates retention of the partially uncoiled orientation of the polymer molecules when first deposited from the polymer solution.

The process of producing the polymer membranes entails producing a film of gelled polymer from the layer of polymer solution under conditions sufficient to provide a non-wetting, high surface tension solution within the layer of polymer solution. Preferably gelation of the polymer into a continuous gel phase occurs while maintaining at least 70% of the total liquid content of the initial polymer solution. More particularly, the precipitation of the gelled polymer is caused by a means selected from the group consisting of cooling, extended dwell time, solvent evaporation, vibration, or ultrasonics. Then, the balance of the liquids are removed by a unidirectional process, usually by evaporation, from the formed film to form a strong micro-porous membrane of geometry controlled by the combination of the two liquids in the medium. The present invention of producing the highly porous separator avoids, the use of a liquid bath to extract the liquids from the membrane. Rather, the liquid materials preferably evaporate at moderate temperatures, i.e. at a temperature lower than that used for the polymer dissolution to prepare the polymer solution. The reduced temperature may be accomplished by the use of cool air or even the use of forced convection with cool to slightly warmed air to promote greater evaporative cooling.

The interaction among the two liquids (with their different surface tension characteristics) and the polymer (with a surface energy intermediate the surface tensions of the liquids) yields a membrane with high porosity and relatively uniform pore size throughout its thickness. The surface tension forces act at the interface between the liquids and the polymer to give uniformity to the cell structure during the removal step. The resulting product is a solid polymeric membrane with relatively high porosity and uniformity of pore size. The strength of the membrane is surprisingly high, due to the more linear orientation of polymer molecules.

The ratio of the principal liquid to the second liquid at the point of gelation needs to be such that the surface tension of the composite liquid phase is greater than the surface energy of the polymer. For example, if the composite liquid phase (after partial evaporation of a portion of acetone as the principal liquid to cool the cast liquid and cause a supersaturated condition) contains 80 wt % acetone having a surface tension of 23.5 dynes/cm and 20 wt % of water as the second liquid having a surface tension of 72.5 dynes/cm yields a total surface tension of 33.3 dynes/cm (18.8+14.5) based upon the weight fraction and 53.3 based upon mol fraction.

Thermodynamic calculations show that adiabatic cooling of a solution can be significant initially and that the temperature gradient through such a film is very small (in contrast to concentration gradients of the prior art). The latter is thought responsible for the exceptional uniformity obtained by the present invention of producing highly porous polymer membranes.

Adiabatic cooling calculations based on the formulation of Example 1 below, show that the temperature drop starts out at 3.1° C. for each 1 percent of acetone that evaporates from the film. The temperature gradient across a 500-micron thick wet film would then be 0.13° C. for each 1% of acetone evaporated from the film. By the time that 4% of the acetone evaporates (presumed adiabatically) the temperature drop can be 12° C. and the temperature gradient is only 0.52° C. If the substrate is pre-cooled this temperature drop can be increased considerably while maintaining a low temperature gradient.

After gelation has occurred, somewhat higher temperatures can be used to facilitate removal of the remaining liquids therefrom, so long as the temperature is not so high that the gel re-dissolves. The maximum liquid removal temperature is preferably less than about 100° C., more preferably less than about 80° C., and most preferably less than about 60° C.

The polymers used to produce the microporous membranes of the present invention are organic polymers. Accordingly, the microporous polymers comprise carbon and a chemical group selected from hydrogen, halogen, oxygen, nitrogen, sulfur and a combination thereof. Preferably, the composition of the microporous polymer includes a halogen. Preferably, the halogen is selected from the group consisting of chloride, fluoride, and a mixture thereof.

Suitable polymers for use herein are either semi-crystalline or a blend of at least one amorphous polymer and at least one crystalline polymer.

Preferred semi-crystalline are selected from the group consisting of polyvinylidene fluoride, polyvinylidene fluoride-hexafluoropropylene copolymer, polyvinyl chloride, polyvinylidene chloride, chlorinated polyvinyl chloride, polymethyl methacrylate, and mixtures of two or more of these semi-crystalline polymers.

Preferably the products produced by the process of this producing highly porous polymer membranes are used as a battery separator. For this use, the polymer will most commonly comprise a polymer selected from the group consisting of polyvinylidene fluoride (PVDF), polyvinylidene, fluoride-hexafluoropropylene copolymer (PVDF-HFP), polyvinyl chloride, and mixtures thereof. Still more preferably the polymer will comprise at least about 75% polyvinylidene fluoride.

The "MacMullin" or "McMullin" Number measures resistance to ion flow as defined in U.S. Pat. No. 4,464,238, the subject matter of which is incorporated herein by reference. The MacMullin Number is "a measure of resistance to movement of ions. The product of MacMullin Number and thickness defines an equivalent path length for ionic transport through the separator. The MacMullin Number appears explicitly in the one-dimensional dilute solution flux equations which govern the movement of ionic species within the separator; it is of practical utility because of the ease with which it is determined experimentally." The lower a MacMullin Number the better for battery separators. Products of the present invention have a low MacMullin number, i.e. about 1.05 to 3, preferably about 1.1 to less than 2, most preferably about 1.2 to about 1.8.

Good tortuosity is an additional attribute of the highly porous polymer membranes. A devious or tortuous flow path with multiple interruptions and fine pores acts as a filter against penetration of invading solids. Tortuosity of the flow path can be helpful to prevent penetration by loose particles from an electrode or to minimize growth of dendrites through a separator that might cause electrical shorts. This characteristic cannot be quantified, except by long-term use, but it can be observed qualitatively by viewing a cross-section of the porosity as seen. Each orifice (many about 1 micron in diameter) between adjacent voids represents a filter to capture loose particles or a barrier to growth of dendrites.

The polymer membranes produced are generally uniform and symmetric, i.e. the substrate side pores are substantially similar in size to the central and the air side pores. Pores which vary in diameter by a factor of about 5 or less are sufficiently uniform for the membrane to function in a symmetric manner. While some variation in pore sizes is evident in the figures and it may be of merit in an electrode separator where loose particles or dendrites are a particular problem, generally the more symmetric a membrane, the better performance as a battery separator. Prior art asymmetric PVDF membranes have had variations in pore sizes ranging from 10 to several hundred.

Numerous polymer membranes have been prepared using variations of the procedure of Example 1 and have provided films with thickness ranging from about 15 to 100 microns, with porosities up to 95%, with Gurley flow numbers as low 0.1 second, and MacMullin numbers of 1.05 to 1.5. Permeabilities were as high as 1870 cm micron cpoise/minute Torr. Mercury porosimetry tests have shown the presence of some large pores ranging from 0.2 micron diameter up to 7 microns in different membranes, but with average pore sizes ranging from about 0.2 to 1.0 micron. Films have been produced with average pore diameters of 0.245 micron (85% porosity) and 0.398 microns (86% porosity). Prior art films have shown far smaller average pore diameters, e.g. 0.064 micron and correspondingly a far lower porosity (57%).

The percentage of blind pores ranges from less than 1% to a maximum of 10% in some inferior films. Surface areas are usually in the range of about 5 to 8 sq. meters/gm.

Highly porous membranes have been cast directly onto battery electrodes and onto porous structures (e.g. non-woven films) thus obviating or facilitating mechanical transfer. This permits higher porosity separators to be made without the necessity of high tensile strength and tensile modulus.

Where additional strength or stiffness may be needed for handling purposes, micro- or nano-particles can be added to the formulation with such particulates residing within the polymer phase. A few such additives include silica aerogel, talc, and clay.

The method for improving battery capacity can now best be understood. The methods mentioned above produced the highly dense electrode and the highly porous polymer membrane which are utilized below.

3. Improving Battery Capacity Using an Optimized Electrochemical Cell

Battery capacity is increased by using the above described methods in combination to produce an optimized electrochemical cell. Specifically, the optimized electrochemical cell is produced by first making a positive, high density electrode, and a negative high density electrode as described supra. Next, a symmetric, strong highly porous, microporous polymer member is produced using one of the preferred processes described supra.

The natural result when discharging ions from the second active material of the negative high density electrode through the aprotic ion conducting liquid of the second chamber is an increasing rate capability of the ion flow. This is caused by reducing interfacial resistance to ion flow, by increasing porosity of the polymer membrane using the methods described supra by controlling pore size and solids distribution, to levels below those at the surface of the bulk components of the electrochemical cell. Also, the interfacial resistance at an electrode and the separator must not exceed the value in the chambers. The ion conductivity of the separator must meet or exceed that in either or both electrodes. The ions are then accepted into the first active material of the positive high density electrode of the first chamber through the protogenous ion conducting liquid. Recharging of the electrochemical cell is then possible by adding an energy source to the positive high density electrode and causing the ions to travel from the positive high density electrode of the first chamber through the protogenous ion conducting liquid and the polymer membrane to the negative high density electrode of the second chamber. A secondary optimized electrochemical cell is thus created by repeating discharging of the ions and continuing the method.

In conclusion, herein is presented an optimized microporous structure of electrochemical cells. The invention is illustrated by example in the drawing figures, and throughout the written description. It should be understood that numerous variations are possible, while adhering to the inventive concept. Such variations are contemplated as being a part of the present invention.

What is claimed is:

1. A method for improving battery capacity, using an electrochemical cell, the steps comprising:
   (a) making a positive high density electrode;
   (b) making a negative high density electrode;
   (c) producing a symmetric, strong, highly porous, microporous polymer membrane by: (a) preparing a solution of one or more polymers in a mixture of a principal liquid which is a solvent for the polymer and a second liquid which is miscible with the principal liquid, wherein (i) the principal liquid has a surface tension at least 5% lower than the surface energy of the polymer, (ii) the second liquid has a surface tension at least 5% higher than the surface energy of the polymer, (iii) the normal boiling point of the principal liquid is less than 125° C. and the normal boiling point of the second liquid is less than about 160° C., (iv) the polymer has a lower solubility in the second liquid than in the principal liquid, and (v) the solution is prepared at a temperature less than about 20° C. above the normal boiling point of the principal liquid and while precluding any substantial evaporation of the principal liquid, (b) reducing the temperature of the solution by at least 5° C. to between the normal boiling point of the principal liquid and the temperature of the substrate upon the solution is to be cast, (c) casting the polymer solution onto a high surface energy substrate to form a liquid coating thereon, said substrate having a surface energy greater than the surface energy of the polymer, and (d) removing the principal liquid and the second liquid from the coating by unidirectional mass transfer without use of an extraction bath, (ii) without redissolving the polymer, and (iii) at a maximum air temperature of less than about 100° C. in a period of about 5 minutes, to form the strong, highly porous, thin, symmetric polymer membrane;
   (d) discharging ions from second active material of the negative high density electrode through the aprotic ion conducting liquid of the second chamber;
   (e) increasing rate capability of the ion flow by reducing interfacial resistance to ion flow by increasing porosity of the polymer membrane by controlling pore size and solids distribution; and
   (f) accepting ions into the first active material of the positive high density electrode of the first chamber through the protogenous ion conducting liquid;
   producing a symmetric, strong, highly porous, microporous polymer membrane said electrochemical cell comprising:
   a housing divided into two chambers, a first and a second chamber, said first chamber containing protogenous ion-conducting liquid and a positive high density electrode including a first active material and a porous binder, surrounded by a surface having a porosity level, wherein the porosity level increases towards the surface, said second chamber containing an aprotic, ion conducting liquid and a negative high density electrode including a second active material and a porous binder, surrounded by a surface having a porosity level, wherein the porosity level increases towards the surface; and a symmetric, strong, highly porous, microporous polymer membrane dividing the housing into said first and second chamber, and said polymer membrane having a porosity level, wherein the porosity level of the polymer membrane is greater than the porosity level at the surface of the positive and negative high density electrodes and the porosity level of the polymer membrane is 25% higher than the porosity level of the high density electrodes.

2. The method of claim 1, further comprising the step of
   (g) adding an energy source to the positive high density electrode and causing the ions to travel from said positive high density electrode of the first chamber through the protogenous ion conducting liquid and the polymer membrane to the negative high density electrode of the second chamber.

3. The method of claim 2, further comprising making a secondary optimized electrochemical cell by repeating steps (d) through (g).

4. The method of claim 1, the steps further comprising
   making the positive high density electrode by adding a binder to the first active material to form an unprocessed electrode material, mixing said first active material with said binder using a transport medium, said first active material having a specific gravity that is at least 10 percent higher than a specific gravity of said transport medium, processing said unprocessed electrode material in a centrifuge to produce a processed electrode material, and constructing said first processed electrode material into an electrochemical device.

5. The method of claim 1, the steps further comprising making the negative high density electrode by adding a binder to the second active material to form an unprocessed electrode material, mixing said second active material with said binder using a transport medium, said first active material having a specific gravity that is at least ten percent higher than a specific gravity of said transport medium, processing said unprocessed electrode material in a centrifuge to produce a processed electrode material, and constructing said first processed electrode material into an electrochemical device.

6. The method of claim 1, the steps further comprising
   the producing a symmetric, strong, highly porous, microporous polymer film by (a) forming a layer of a polymer solution on a substrate, wherein the polymer solution comprises two miscible liquids and a polymer material dissolved therein, and wherein the two miscible liquids comprise (i) a principal liquid that has a surface tension at least 5% lower than the surface energy of the polymer and (ii) a second liquid that has a surface tension at least 5% greater than the surface energy of the polymer, (b) producing a film of gelled polymer from the layer of polymer solution under conditions sufficient to provide a nonwetting, high surface tension solution within the layer of polymer solution, and (c) rapidly removing the liquid from the film of gelled polymer by unidirectional mass transfer without dissolving the gelled polymer to produce the strong, highly porous, microporous polymer film.

7. The method of claim 1, the steps further comprising producing a symmetric, strong, highly porous, microporous polymer membrane by (a) dissolving about 3 to 20% by weight of a polymer in a heated multiple liquid system comprising (a) a principal liquid which is a solvent for the polymer and (b) a second liquid to form a polymer solution, wherein (i) the principal liquid has a surface tension at least 5% lower than the surface energy of the polymer, (ii) the second liquid has a surface tension at least 5% greater than the surface energy of the polymer; and (iii) the polymer has a lower solubility in the second liquid than it has in the principal solvent liquid; (b) reducing the temperature of the solution by at least 5° C. to between the normal boiling point of the principal liquid and the temperature of the substrate upon which it will be cast; (c) casting a film of the fully dissolved solution onto a substrate which has a higher surface energy than the surface energy of the polymer;

(d) precipitating ihe polymer to form a continuous gel phase while maintaining at least 70% of the total liquid content of the initial polymer solution, said precipitation caused by a means elected from the group consisting of cooling, extended dwell time, solvent evaporation, vibration, or ultrasonics; and (e) removing the residual liquids without causing dissolution of the continuous gel phase by unidirectional mass transfer without any extraction bath, at a maximum film temperature which is less than the normal boiling point of the lowest boiling liquid, and within a period of about 5 minutes, to form a strong, highly porous, thin, symmetric polymer membrane.

\* \* \* \* \*